United States Patent Office 3,595,674
Patented July 27, 1971

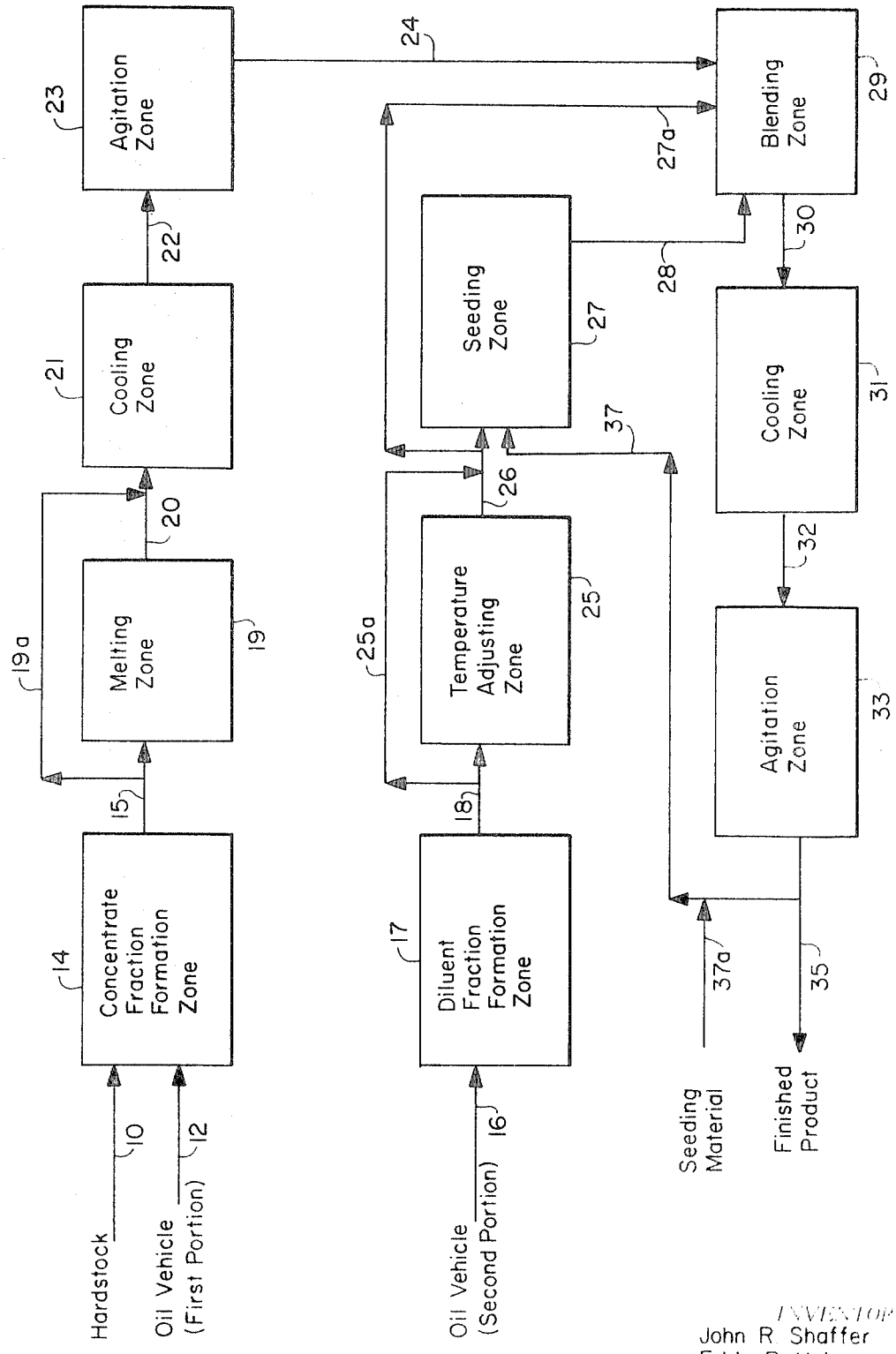

3,595,674
METHOD OF PREPARING A LIQUID SHORTENING
John R. Shaffer, Cincinnati, and Eddy R. Hair, Colerain Township, Hamilton County, Ohio, assignors to The Procter & Gamble Company, Cincinnati, Ohio
Filed Dec. 16, 1968, Ser. No. 784,042
Int. Cl. A23d 5/00
U.S. Cl. 99—118                            10 Claims

ABSTRACT OF THE DISCLOSURE

An exceptionally stable liquid shortening suitable for use in continuous bread making, crouton making, and doughnut frying is produced by a novel method. The method comprises forming concentrate and diluent fractions, separately processing each of these fractions, blending the processed fractions, and then processing the blend.

BACKGROUND OF THE INVENTION

The field of this invention is the preparation of liquid shortenings.

A particular shortening suitable for use in continuous bread making, crouton making, and doughnut frying is known in the prior art. For example, such a shortening is disclosed in Table I of Koren and Menzies U.S. Pat. No. 3,350,207.

This shortening is prepared from particular hardstock and particular liquid glyceride oil vehicle constituents.

The hardstock constituent amounts to from about 8% to about 21% by weight of the shortening, preferably from about 10% to about 18% by weight of the shortening. It consists of substantially fully hydrogenated normally solid fatty triglyceride, and optionally also of normally solid fatty emulsifier. The hardstock constituent ordinarily has an iodine value of less than about 15; preferably it has an iodine value ranging from about 1 to about 10.

The normally solid fatty triglyceride in the hardstock constituent, i.e. the triglyceride hardstock, amounts to from about 8% to about 15% by weight of the shortening, preferably from about 10% to about 13% by weight of the shortening. It ordinarily contains in each of its acid moieties from about 12 to about 22 carbon atoms. It has an iodine value less than about 15; preferably it has an iodine value ranging from about 1 to about 12. It consists of from about 85% to 100° by weight of beta-tending triglyceride and from 0% to about 15% by weight of non-beta-tending triglyceride. Preferably, the triglyceride hardstock is all beta-tending triglyceride. If the triglyceride hardstock contains non-beta-tending triglyceride, the non-beta-tending triglyceride usually amounts to at least about 0.5% by weight of the triglyceride hardstock. The phrase "beta-tending" is used herein to denote triglyceride hardstock which when melted and then cooled has a propensity for crystallizing in the beta polymorphic phase rather than in either the alpha or beta-prime polymorphic phases. The phrase "non-beta-tending" hardstock is used herein to define triglyceride hardstocks which when melted and then cooled have a propensity for crystallizing in either the alpha or beta-prime polymorphic phases instead of in the beta polymorphic phase. The alpha, beta, and beta-prime polymorphic shortening phases are described in Holman and Quimby, U.S. Pat. 2,521,219.

The beta-tending triglyceride in the hardstock can be, for example, substantially completely saturated triglyceride fats containing major amounts, for example more than 40%, of tristearin, tripalmitin, and/or symmetrical palmitodistearin. Suitable normally solid triglycerides having strong beta-forming tendencies include, for example, substantially completely hydrogenated triglyceride fats derived from soybean oil, corn oil, hazelnut oil, lard, linseed oil, olive oil, peanut oil and sunflower seed oil. Substantially completely hydrogenated soybean oil, for example soybean oil hydrogenated to an iodine value of 8, is a preferred beta-tending triglyceride constituent.

Non-beta-tending triglyceride constituents suitable for use in the hardstock include, for example, hydrogenated fats derived from cottonseed oil, palm oil, tallow, whale oil, and fish oil.

The normally solid fatty emulsifier in the hardstock, i.e. the emulsifier hardstock, amounts to from 0 to about 6% by weight of the shortening, preferably from about 2% to about 5% by weight of the shortening. At least about 0.8% by weight of the shortening of emulsifier hardstock is usually necessary before the effect of the emulsifier is apparent when the shortening is utilized. The emulsifier hardstock is selected from the group consisting of fatty monoglycerides, fatty diglycerides, fatty acid monoesters of propylene glycol and mixtures thereof. The emulsifiers contain in their acid moieties from about 16 to about 22 carbon atoms. The emulsifiers have an iodine value of less than about 15; preferably they have an iodine value ranging from about 1 to about 12.

Useful fatty mono- and diglyceride emulsifier solids can be derived from any suitable source including those animal and vegetable oils enumerated above as sources of fatty triglyceride solids. Preferred glyceride emulsifiers are derived by superglycerinating soybean oil which has previously been hydrogenated to an iodine value less than about 15; such superglycerination is advantageously utilized to produce a mixture containing about 30% to 40% monoglycerides with most of the rest of the constituents that are present being diglycerides, with a minor proportion, for example about 10% or less, of residual triglycerides.

Useful fatty acid monoesters of propylene glycol can be prepared as described in Howard U.S. Pat. No. 3,145,108.

As a result of the relatively high percentage of hardstock constituent in the liquid shortening product compared to the levels of such hardstock in most liquid shortenings, this particular shortening is suitable for use in continuous bread making without "crippling" of loaves occurring.

As a result of the high level of beta-tending triglyceride in the hardstock constituent, the constituents can be processed into liquid shortening form which does not convert to plastic form during the shelf life of the product.

The liquid glyceride oil vehicle constituent of the shortening amounts to from about 79% to about 92% by weight of the shortening. It contains a very low level, that is, less than about 2.5% by weight of its acid moieties expressed as acids, of triunsaturated acid moiety; in particular its acid moieties expressed as acids contain less than about 2.5% of linolenic acid. In addition, the oil vehicle is characterized by an SCI value ranging from 0 to about 5 at 50° F.

Glyceride oil vehicles useful herein are edible and should consist primarily of triglycerides; they can be derived from any of the naturally occurring liquid glyceride oils such as soybean oil, cotton seed oil, peanut oil, rapeseed oil, sesame seed oil, and sunflower seed oil. Also suitable are edible liquid oil fractions obtained from palm oil, lard, and tallow, as, for example, by graining or directed interesterification, followed by separation of the oil. To achieve the low level of linolenic acid moiety content required herein, oils containing higher levels of triunsaturated acids than about 2.5% require hydrogenation to decrease the percentage of triunsaturated acid moieties.

Oils having SCI values greater than about 5 at 50° F. can have their SCI contents reduced to the levels useful herein by winterizing. Also suitable for use herein as glyceride oil vehicles are the so-called low molecular synthetic fats which are certain tri- or diglycerides in which one or two of the hydroxyl groups of the glycerine have been esterified with acetic, propionic, butyric, or caproic acids and one or two of the remaining hydroxyl groups of the glycerine have been esterified with higher molecular weight fatty acids having from 12 to 22 carbon atoms. Any mixture of the above enumerated liquid glyceride vehicles can be used as the oil vehicle for the particular liquid shortening involved herein.

As a result of the low level of triunsaturated acid moiety in the glyceride oil vehicle, the liquid shortening involved herein is oxidation resistant and therefore suitable for use in crouton making and for doughnut frying.

As a result of the low solids content of the glyceride oil vehicle at 50° F., the particular liquid shortening involved herein can be processed by the method herein to remain liquid and stable against separation of components over normally encountered temperatures.

The particular shortening involved herein comprises a suspension of the hardstock constituent in particulate form in the glyceride oil vehicle. In the finished product liquid shortening, substantially all of the triglyceride hardstock constituent is present in the beta polymorphic phase. This can be achieved despite the fact that some non-beta-tending triglyceride hardstock, as defined hereinbefore, is utilized as part of the hardstock constituent. The hardstock constituent particle size in the suspension ranges from about 5 microns to about 200 microns, preferably from about 10 microns to about 100 microns. The presence of the triglyceride hardstock constituents in the beta phase and of all of the hardstock constituents in particulate form allows the successful processing of the hardstock and oil vehicle constituents into a shortening having a stable liquid state. This is because the beta phase is the most stable polymorphic phase, and beta phase triglyceride hardstock in the liquid shortening tends to remain in this polymorphic state whereby the continued liquidity of the shortening is not disturbed; on the other hand, liquid shortening triglyceride hardstock crystallized in alpha and/or beta-prime phases tends to convert to the beta phase forming interlacing crystal structures and eventually result in a plastic shortening being formed. As a result of the particle size specified herein the product is not grainy and can be processed by the method herein to be exceptionally stable against gravity separation of solid and liquid components, and moreover, can be processed by the method herein so as to be pourable and not unduly viscous.

This shortening is not made in entirely satisfactory fashion by the various known methods for preparing liquid shortenings, including the methods described in U.S. Pat. No. 2,521,219; U.S. Pat. No. 2,521,242; U.S. Pat. No. 2,815,285; U.S. Pat. No. 2,815,286; U.S. Pat. No. 2,875,-065; U.S. Pat. No. 3,028,244; U.S. Pat. No. 3,047,402; U.S. Pat. No. 3,325,292; U.S. Pat. No. 3,369,909; British Pat. No. 1,025,992; and British Pat. No. 1,074,121. None of these methods is entirely satisfactory when applied to the constituents of the particular shortening involved herein, because the application of these methods produces in a reasonable processing time from these constituents a shortening either in plastic form or which does not remain liquid at normally encountered temperatures, or else which is not very stable against separation of liquid and solid components during the shelf life of the product. For example, the processes of U.S. Pats. 3,325,292 and 3,369,909 form plastic shortenings when applied for the processing times of the invention herein to the constituents of the particular shortening involved herein.

SUMMARY OF THE INVENTION

It has now been discovered that the above described liquid shortening with the benefits of liquidity and exceptional stability against separation of components over the range of normally encountered temperatures, can be prepared by a novel process involving (1) forming particular concentrate and diluent fractions, (2) separately processing the concentrate fraction, (3) separately processing the diluent fraction, (4) blending the fractions, and (5) processing the blend, each of these steps being carried out in a particular manner.

More particularly, the novel process of this invention involves forming a concentrate fraction consisting of oil vehicle and hardstock, and a diluent fraction consisting only of oil vehicle. The concentrate fraction in melted form is cooled to the beta crystalline range and agitated. The diluent fraction having a temperature in a particular range is preferably seeded. The fractions are blended by adding the concentrate fraction to a batch of the diluent fraction or by adding the fractions together continuously. The blend is then cooled and agitated.

This novel process has the advantage of producing the shortening in liquid and exceptionally stable form. In particular, a shortening is produced which remains pourable at temperatures normally encountered, that is, the temperatures ranging from about 60° F. to about 100° F. Moreover, the produced liquid shortening is exceptionally stable against separation of components at temperatures normally encountered, i.e., 60°–100° F. In other words, the tendency of the solid and/or liquid phases in the shortening to separate out into a second layer before the product is utilized is minimized. More particularly, the shortening produced by this novel process ordinarily separates into a second layer only to the extent of less than about 5% by volume, even after one month subsequent to processing and to the extent of less than about 10% by volume even after three months subsequent to processing. On the other hand, a typical commercially available liquid shortening usually separates into a second layer amounting to about 10% by volume within two weeks after processing. Thus, there is produced by the method herein a shortening which is essentially uniform and which therefore produces uniform results upon utilization. Furthermore, the process herein produces a product with these benefits in a processing time ranging from about 0.5 to about 9 hours, usually less than 5 hours; this processing time is suitable for a large scale commercial shortening-producing manufacturing operation.

DETAILED DESCRIPTION OF THE INVENTION

With continuing reference to the single figure of the drawing, the process of the present invention comprises introducing hardstock constituent 10 in solid or melted condition and a portion of the glyceride oil vehicle 12 to a concentrate formation zone 14 to form a concentrate fraction 15. The rest of the oil vehicle 16 is introduced into a diluent formation zone 17 wherein it is utilized to form a diluent fraction 18. The formed concentrate fraction, if not already in melted condition, is then melted in a melting zone 19 to form melted concentrate 20. If the formed concentrate fraction is already in melted condition previous to being treated in melting zone 19, the melting zone 19 can be eliminated or zone 19 can be bypassed via bypass 19a. The melted concentrate 20 from melting zone 19 or from zone 14 for example via bypass 19a is introduced into a cooling zone 21 where it is cooled to a temperature in the beta crystalline range to produce cooled concentrate 22 and to initiate crystallization therein. This cooled concentrate 22 is introduced into an agitation zone 23 wherein the cooled concentrate is given dwell time to allow further completion of hardstock crystallization and produce processed concentrate fraction 24 which is to be blended with processed diluent fraction. The formed diluent fraction 18 is introduced into a temperature adjustment zone 25 where, if necessary, its temperature is adjusted to a particular range to produce temperature-adjusted diluent fraction 26. If the temperature of diluent fraction 18 is already at the required level without temperature adjustment, the temperature adjustment zone 25 can be eliminated or zone 25 can be bypassed via bypass 25a. Preferably, the temperature-adjusted diluent fraction 26 is introduced into seeding zone 27 wherein it is seeded to produce seeded diluent fraction 28. Then the seeded diluent fraction 28 is introduced from zone 27 into blending zone 29. Alternatively, in a non-preferred embodiment, temperature-adjusted diluent fraction 26 is introduced directly into blending zone 29 without being seeded as indicated by arrow 27a. In blending zone 29 the processed concentrate fraction 24 from agitation zone 23 is added to and/or admixed with the seeded temperature-adjusted diluent fraction 28 or with temperature-adjusted diluent fraction 26 to produce a concentrate-diluent blend 30. This combination of ingredients 30 is introduced into a cooling zone 31 wherein its temperature is reduced to produce a cooled blend 32. From there, the cooled blend 32 is introduced into agitation zone 33 wherein it is given dwell time to produce the finished liquid shortening product 35 containing substantially all of its hardstock in particulate form and in the beta polymorphic phase. A very minor portion of the finished product 35 can be utilized and introduced via pipe 37 into seeding zone 27 to seed the temperature-adjusted diluent fraction 26 as previously described or other seeding material can be introduced via pipes 37a and 37.

Turning now to the concentrate fraction formation 14, the concentrate fraction 15 is formed by admixing all of the hardstock with a portion of the glyceride oil vehicle. In this concentrate fraction formation, the oil vehicle is divided into two portions, a first portion used for concentrate fraction formation and a second portion which is reserved for use as the diluent fraction; to form the concentrate fraction, the hardstock can be added to the first portion of glyceride oil vehicle, or the first portion of the vehicle can be added to the hardstock or the two can be added to each other simultaneously. The hardstock utilized during this concentrate fraction formation can be in solid condition or in melted condition having been exposed for example to a melting zone (not shown) previous to the concentrate fraction formation zone. The concentration of hardstock in the concentrate fraction ordinarily ranges from about 16% to about 42% by weight of the concentrate fraction, preferably from about 20% to about 36% by weight of the concentrate fraction. The concentration of normally solid fatty triglyceride in the hardstock constituent normally amounts to from about 16% to about 30% by weight of the concentrate fraction, preferably from about 20% to about 26% by weight of the concentrate fraction. The amount of emulsifier in the hardstock constituent ordinarily ranges from 0% to about 12%, preferably from about 4% to about 10%, by weight of the concentrate fraction. The diluent fraction 18 consists only of the remainder of the oil vehicle. The weight ratio of concentrate fraction 15 to diluent fraction 18 ranges from about 1:3 to about 3:1, preferably ranging from about 1:1.5 to about 1.5:1.

The concentrate fraction 15, if not already in melted condition, is introduced into melting zone 19, for example, a jacketed stainless steel vessel, through the jacket of which steam can be circulated, wherein all the concentrate fraction constituents are melted. Normally the temperature which is imparted to the constituents in this melting zone 19 and which is required to melt these constituents ranges from about 140° F. to about 180° F.

The concentrate fraction in melted condition is introduced into cooling zone 21, for example, a scraped wall heat exchanger, wherein its temperature is reduced so as to range from about 90° F. to about 140° F., preferably from about 100° F. to about 135° F., that is, to the beta crystalline range This temperature reduction step is ordinarily carried out over a time period ranging from about 8 seconds to about 60 seconds. As a result of this temperature reduction step, crystallization of the hardstock in the melted concentrate fraction is initiated.

The cooled concentrate wherein crystallization has been initiated in cooling zone 21 is introduced into agitation zone 23 wherein the cooled concentrate fraction is subjected to agitation over a period of time ranging from about 10 minutes to about 5 hours. This agitation period provides time during which more crystallization and conversion of crystals to the beta phase occurs. This agitation period can be apportioned between a moderate agitation period and a mild agitation period. It is required that the cooled concentrate fraction be subjected to a moderate agitation period, that is, for example, to a "picking" step with agitation at a rate ranging from about 100 r.p.m. to about 250 r.p.m., for from about 10 minutes to about 30 minutes as part or all of the agitation step. Thereafter the cooled concentrate fraction can be exposed to mild agitation, e.g. 5 r.p.m., in a tempering step for a period ranging from 0 to about 4.5 hours, preferably ranging from about 30 minutes to about one hour.

Turning now to the separate processing of the diluent fraction, it is essential that the formed diluent 18 have a temperature ranging from about 70° F. to about 100° F., preferably from about 80° F. to about 95° F. If the diluent fraction does not already have a temperature in this range, for example, if it is received from a conventional oil deodorization process at a temperature ranging from about 115° F. to about 200° F., i.e. at a temperature higher than the above specified range, it can be introduced into a temperature adjustment zone 25, for example a scraped wall heat exchanger, where its temperature is adjusted to this range.

The temperature-adjusted diluent fraction 26 from zone 25 or from zone 17 via bypass 25a is preferably introduced into seeding zone 27 where it is seeded with from about 0.05% of its weight to about 10% of its weight of liquid shortening containing beta-phase triglyceride crystals. The seeding material, that is, shortening containing beta-phase triglyceride crystals can be, for example, finished product shortening 35 or processed concentrate fraction 24 or any commercially available liquid shortening containing beta-phase triglyceride crystals. Preferably the cooled diluent fraction is seeded with from about 0.5% to about 2% of its weight of finished shortening product 35. In this seeding step, the seeding material is added to the temperature adjusted diluent fraction and admixed therewith to form a seeded diluent fraction 28. This seeding of the diluent fraction previous to the blending step described hereinafter insures the achievement of more uniform hardstock crystal size during and after blending and therefore better resistance to oil separation in the finished product and better fluidity at any given temperature within the range of about 60° F. to about 100° F.

Temperature adjusted diluent fraction 26 via bypass 27a or seeded diluent fraction 28 from zone 27 is then introduced into blending zone 29. The processed diluent fraction 26 or 28 is either wholly introduced into blending zone 29 before processed concentrate fraction is introduced into that zone or the processed diluent fraction and processed concentrate fraction are introduced simultaneously into the blending zone 29. If, on the other hand, the processed concentrate fraction 24 is introduced into blending zone 29 previous to the introduction of processed diluent fraction into that zone, an exceptionally stable finished product as hereinbefore defined may not be achieved. Blending is carried out by admixing processed concentrate fraction with processed diluent fraction in blending zone 29 to produce diluent-concentrate blend 30.

If processed diluent fraction 26 or 28 is wholly introduced into blending zone 29 before processed concentrate fraction is introduced into that zone, that is, if processed concentrate fraction is to be added to and admixed with a batch of processed diluent fraction, processed concentrate fraction is added to and blended with the batch of processed diluent fraction at a rate ranging from about 0.008% to about 0.25% of the initial weight of the concentrate fraction to be blended per second. Preferably, the rate of concentrate fraction addition is controlled within the range of about 0.01% to about 0.025% of the initial concentrate fraction's weight being added to the processed diluent fraction per second. This blending can be conveniently carried out from example in a stainless steel vessel equipped with a stirrer. This blending can be conveniently carried out for example 3.5 hours.

If processed diluent fraction and processed concentrate fraction are introduced into blending zone 29 simultaneously, this blending step can be carried out continuously. If this step is carried out continuously, the processed fractions are added to blending zone 29 in the weight ratios previously recited herein. In a continuous process throughputs for each of the fractions ranging from about 5000 pounds per hour to about 25,000 pounds per hour are conveniently employed. This blending is conveniently carried out for example in an in-line mixer at an r.p.m. ranging from about 250 to about 750 with a residence time for any particular portion of the blend in the mixer ranging from about 0.5 second to about 10 seconds.

The blend 30 of concentrate and diluent is introduced from blending zone 29 into cooling zone 31 wherein it is cooled to a temperature in the range of about 70° F. to about 100° F., preferably ranging from about 80° F. to about 95° F.

The cooled blend 32 is then subjected to moderate agitation in zone 33, for example to a "picking" step with agitation at a rate ranging from about 100 r.p.m. to about 250 r.p.m., for a time period ranging from about 10 minutes to about 30 minutes, preferably from about 15 to about 25 minutes, whereby finished product is produced.

The finished product can be packaged, for example, by conventional methods in conventional liquid shortening containers; or it can be stored and sold in truckload or tank car quantities.

The finished product is pourable. It is estimated that immediately after the moderate agitation step in zone 33, the finished product contains at least about 70% of its glyceride hardstock in the beta phase. Substantially all of the rest of its glyceride hardstock converts to the beta phase within about 1 to 3 hours after processing. The product remains pourable at temperatures normally encountered, that is, at 60° F. to 100° F., and is exceptionally stable against separation of components as hereinbefore described.

In summary, the novel method of the present invention broadly reads as follows:

A method for preparing a stable liquid oxidation-resistant shortening comprising from about 8% to about 15% by weight normally solid fatty triglyceride having an iodine value of less than about 15 and which consists of from about 85% to about 100% beta-tending triglyceride and from 0% to about 15% non-beta-tending triglyceride, and from 0 to about 6% normally solid fatty emulsifier having an iodine value of less than about 15, said normally solid triglyceride and emulsifier being suspended in particulate form in an edible liquid glyceride oil vehicle having an SCI value at 50° F. ranging from 0 to about 5 and containing less than about 2.5% triunsaturated acid moiety expressed as acid based on the total weight of acid moieties expressed as acid in the glyceride oil vehicle, said method comprising the steps of (a) Dividing the glyceride oil vehicle into a first portion and a second portion and blending all of said normally solid triglyceride and emulsifiers in solid or melted condition with said first portion to form a concentrate fraction and utilizing said second portion as a diluent fraction, the weight ratio of concentrate fraction to diluent fraction ranging from about 1:3 to about 3:1;

(b) Melting all the constituents of said concentrate fraction if they are not already all in melted condition, cooling the melted concentrate fraction to a temperature ranging from about 90° F. to about 140° F. to initiate normally solid triglyceride and emulsifier crystallization and particle formation, and agitating over a period ranging from about 10 minutes to about 5 hours to allow further crystallization to ensue;

(c) Adjusting the temperature of said diluent fraction to range from about 70° F. to about 100° F. if the temperature of the diluent fraction is not already in this range;

(d) Blending concentrate fraction with diluent fraction by admixing the product of step (b) hereinbefore with the product of step (c) hereinbefore;

(e) Cooling the blend resulting from step (d) to a temperature ranging from about 70° F. to about 100° F. and then agitating said cooled blend for a period ranging from about 10 to about 30 minutes whereby finished product is produced.

To insure proper use of the exceptionally stable liquid shortening produced by the novel process herein, examples of its use in continuous bread making, crouton making, and doughnut frying are given hereinafter.

One advantageous method of utilizing a shortening produced by the method of this invention is described in Koren and Menzies U.S. Pat. 3,350,207. In that patent, the liquid shortening is utilized in melted condition in a continuous bread making process. In a typical continuous bread making process, a liquid "broth" or "brew" containing yeast, water, sugar, salt, milk solids, yeast nutrients, a portion of the flour, and other minor ingredients is first prepared, and is permitted to ferment until there has been an adequate conversion of the sugar to carbon dioxide and ethanol. After the brew has been properly fermented, the brew and the other dough ingredients are continuously delivered in metered proportions to a first mixing stage where they are continuously mixed. The other dough ingredients which are combined in this first stage with the brew include flour and minor dry ingredients; that is, oxidants, generally a solution of potassium bromate and potassium iodate; and the liquid shortening produced by the method of this invention and thereafter fully melted previous to its use. The resulting mixture is passed through the first mixing stage to produce a pre-mixed dough having substantially uniform properties. The dough is thereafter subjected to a second mixing stage, this time a high speed mixing step, to develop a complete dough suitable for extruding and cutting into proper dough sections which are automatically panned, the pans being conveyed to a final proofing room where the dough is proofed before it is baked in the conventional manner.

Bread having been prepared from the shortening involved herein can be converted into croutons. A typical method for preparing croutons comprises cutting one-half-inch thick slices from 2-day-old loaf bread. The slices are then cut with a cutter, for example, into round, heart, or oval shapes. The resulting pieces of bread are heated in an oven, for example at 400° F. for 15 minutes to produce croutons.

The preparation of doughnuts will be described herein with respect to yeast-raised doughnuts as being typical of the use of the shortening of this invention in the production of doughnuts. Such yeast-raised doughnuts can be prepared by first blending sugar, salt, milk powder, and shortening constituents until a smooth blend is formed. Eggs are then added in two stages to the previous smooth blend and this combination is blended well. At this point water and flavoring such as vanilla and/or mace are added and stirred in. In the meantime, yeast has been dissolved in water and set aside. Then bread flour is added to the already-prepared blend with stirring, the yeast solution is added, and the dough is developed. The developed dough is then shaped and fried in the shortening produced by the process of this invention which has been heated to a temperature, for example, ranging from about 375° F. to about 390° F., to produce fresh browned crisp doughnuts which can be filled at this point if desired.

In the above continuous bread making process no "crippling" of the loaves during and after proofing occurs because of the high level of hardstock in the shortening ingredient. Because the shortening is pourable, it is easily dispensed during the continuous bread making process, and because it is exceptionally stable against separation of components, a uniform product is produced.

Because the shortening produced by the method herein is oxidation resistant, the shortening in the old bread utilized to make croutons does not rancidify. Thus, as a result of the present process, the bread baker has the additional alternatives of utilizing his old bread to make croutons with good keeping qualities.

Moreover, the bread baker has the additional alternative of utilizing the easy-to-dispense stable shortening for doughnut frying without the danger that the doughnuts will rancidify even though the shortening in which they have been fried has been subjected to high frying temperatures which ordinarily encourages oxidation and rancidification. Moreover, the residual shortening can be used again and again for doughnut frying without danger of rancidification or layer separation because of its exceptional stability and oxidation resistance.

The process of the present invention is more fully illustrated in the following example.

EXAMPLE 34.4 pounds of soybean oil hydrogenated to an iodine value of 107 to be used as a glyceride oil vehicle is divided into two portions, one amounting to 14.4 pounds and the other amounting to 20 pounds. This hydrogenated soybean oil has an SCI value at 50° F. of 2.4 and contains 1.5% triunsaturated acid moiety expressed as acid, based on the total weight of acid moieties expressed as acid in this glyceride oil vehicle. This oil has been received from a conventional deodorizing process and is at 120° F. To the portion of the soybean oil which amounted to 14.4 pounds is added 4.0 pounds of triglyceride hardstock in solid condition, and 1.6 pounds of emulsifier hardstock. The triglyceride hardstock is soybean oil hydrogenated to an iodine value of 8; it is 100% beta-tending triglyceride. The emulsifier hardstock is prepared by superglycerinating soybean oil having an iodine value of 8 so that it contains 33% monoglyceride, approximately 65% diglyceride, and the remainder triglyceride. The oil to which has been added the triglyceride hardstock and the emulsifier hardstock is the concentrate fraction, and this concentrate fraction amounts to 20 pounds. The 20 pound portion of the oil to which no hardstock has been added is the diluent fraction. The triglyceride hardstock in the concentrate fraction amounts to 10% by weight of the shortening which is to be produced in this example; the emulsifier hardstock amounts to 40% by weight of the shortening and the oil in the concentrate fraction amounts to 36% by weight of the shortening. The weight ratio of concentrate fraction to diluent fraction is 1:1.

The concentrate fraction is introduced into a steam-jacketed stainless steel vessel wherein by means of steam circulation all the concentrate fraction constituents are melted; a temperature of approximately 155° F. is imparted to the concentrate fraction during this step to melt its constituents. The melted concentrate fraction is pumped from the jacketed stainless steel melting vessel through a scraped wall heat exchanger wherein the temperature of the concentrate fraction is reduced to 130° F. An average sample of concentrate fraction remains in the scraped wall heat exchanger for about 30 seconds. As a result of this residence time in the scraped wall heat exchanger the crystallization of the hardstock in the concentrate fraction is initiated. From the scraped wall heat exchanger the cooled shortening is pumped into a picker wherein it is subjected to moderate agitation, i.e. 180 r.p.m., for about 15 minutes, whereby substantial crystallization of the hardstock in the concentrate fraction occurs.

The diluent fraction is pumped through a scraped wall heat exchanger wherein its temperature is adjusted to 80° F., with an average residence time in the scraped wall heat exchanger of 10 seconds. From the scraped wall heat exchanger the cooled diluent fraction is introduced into a stainless steel vessel equipped with a stirring device.

To this cooled diluent fraction in the stainless steel vessel is added, with stirring, the concentrate fraction which emanates from the picker. The concentrate fraction is added to the batch of cooled diluent fraction at the rate of 0.015% of the initial concentrate fraction's weight per second, that is at a rate of 0.003 pound per second. This blending takes approximately 1.85 hours. After blending, the temperature of the blend is 110° F.

The blend so formed is introduced into a scraped wall heat exchanger wherein its temperature is reduced to 90° F. The blend is in the scraped wall heat exchanger for an average time of 10 seconds. The cooled blend is then introduced into a picker where it is subjected to moderate agitation, that is 180 r.p.m. for 15 minutes whereby finished product is produced. The total processing time is less than 3 hours. The finished product is packaged by conventional means in a conventional container.

One-pound samples of the finished product are stored at each of temperatures 60° F., 70° F., 80° F., 90° F., and 100° F. for a three-month period. After the three-month period the shortening in each of the samples is still liquid and still pourable at temperatures of 60° F. and above and has separated into a second layer to the extent of less than 3% by weight of the shortening.

Shortening made by this process was used for continuous bread making by the process disclosed in Example 1 of U.S. Pat. 3,350,207. During processing of the bread no "crippling" of loaves occurred.

After the bread was three days old it is cut into one-half-inch slices, and these slices are cut into round shapes. The resulting pieces of three-day-old bread are heated in an oven at 400° F. for 15 minutes to provide croutons. These croutons resist oxidation and do not rancidify when stored for periods up to six months.

Yeast-raised doughnuts made according to the process hereinbefore described are fried in the above prepared shortening at 375° F. for 2 minutes to provide cooked doughnuts. These doughnuts do not rancidify when stored for up to four days, the usual maximum period for which doughnuts are stored by bakers before sale or disposal.

The lack of rancidity in the croutons and doughnuts shows the oxidation resistance of the processed shortening.

Similar results of shortening stability and liquidity at normally encountered temperatures are achieved when in the above example 10% of the soybean triglyceride hardstock is replaced with an equal weight of non-beta-phase-tending cottonseed oil hardstock hydrogenated to an iodine value of 8.

Similar results of shortening stability and liquidity at normally encountered temperatures are achieved when in the above example the soybean emulsifier hardstock is replaced with an equal weight of propylene glycol monostearate emulsifier hardstock.

Similar results of shortening stability and liquidity at normally encountered temperatures are achieved when in the above example the hardstock is melted previous to its addition to a portion of the oil to form a melted concentrate fraction and the formed concentrate fraction is not subjected to a melting step previous to its being cooled.

Similar results of shortening stability and liquidity at normally encountered temperatures are achieved when in the above example, the soybean oil vehicle which is divided into two portions is at 80° F. and the diluent fraction temperature adjusting step is eliminated.

Even better results of shortening stability and liquidity at normally encountered temperatures are achieved compared to the results in the above example when in the above example just previous to blending the diluent fraction is seeded with 0.2 pound of finished product shortening. The seeding is carried out by adding the finished product to the diluent fraction in the stainless steel vessel and stirring for 2 minutes. The finished product shortening added to seed the diluent fraction amounts to 1% by weight of the diluent fraction.

Similar results of shortening stability and liquidity at normally encountered temperatures are obtained in the above example when the concentrate fraction emanating from the picker is tempered in a single tempering tank for one hour with mild agitation (i.e. at 5 r.p.m.), and this concentrate fraction is added at the rate of 0.1% of its weight per second to the diluent fraction in the blending step.

Similar results of shortening stability and liquidity at normally encountered temperatures are obtained in the above example when the processed concentrate fraction and processed diluent fraction are blended by being added continuously and simultaneously in a weight ratio of 1:1 into an in-line mixer where these constituents are mixed at 500 r.p.m. The residence time for any particular portion of the blend in the mixer is 2 seconds.

SCI values are measured herein by the dilatometric method of Fulton, Lutton and Wille, JAOCS, 31, 98 (1954).

What is claimed is:

1. A method for preparing a stable liquid oxidation-resistant shortening comprising from about 8% to about 15% by weight normally solid fatty triglyceride having an iodine value of less than about 15 and which consists of from about 85% to about 100% beta-tending triglyceride and from 0% to about 15% non-beta-tending triglyceride, and from 0% to about 6% normally solid fatty emulsifier having an iodine value less than about 15, said normally solid triglyceride and emulsifier being suspended in particulate form in an edible liquid glyceride oil vehicle having an SCI value at 50° F. ranging from 0 to about 5 and containing less than about 2.5% triunsaturated acid moiety expressed as acid based on the total weight of acid moieties expressed as acid in the glyceride oil vehicle, said method comprising the steps of (a) dividing the glyceride oil vehicle into a first portion and a second portion and blending all of said normally solid triglyceride and emulsifiers in solid or melted condition with said first portion to form a concentrate fraction, and utilizing said second portion as a diluent fraction, the weight ratio of concentrate fraction to diluent fraction ranging from about 1:3 to about 3:1;

(b) melting all the constituents of said concentrate fraction if they are not already all in melted condition, cooling the melted concentrate fraction to a temperature ranging from about 90° F. to about 140° F. to initiate normally solid triglyceride and emulsifier crystallization and particle formation, and agitating over a period ranging from about 10 minutes to about 5 hours to allow further crystallization to ensue;

(c) adjusting the temperature of said diluent fraction to range from about 70° F. to about 100° F. if the temperature of the diluent fraction is not already in this range;

(d) blending concentrate fraction with diluent fraction by admixing the product of step (b) hereinbefore with the product of step (c) hereinbefore;

(e) cooling the blend resulting from step (d) to a temperature ranging from about 70° F. to about 100° F. and then agitating said cooled blend for a period ranging from about 10 to about 30 minutes whereby finished finished product is produced.

2. The method of claim 1 wherein the normally solid fatty emulsifier is selected from the group consisting of fatty monoglycerides, fatty diglycerides, fatty acid monoesters of propylene glycol and mixtures thereof.

3. The method of claim 2 wherein the shortening comprises from about 10% to about 13% by weight normally solid fatty triglyceride and from about 2% to about 5% normally solid emulsifier, the weight ratio of concentrate fraction to diluent fraction ranges from about 1:1.5 to about 1.5:1, the melted concentrate fraction is cooled to a temperature ranging from about 100° F. to about 135° F., the diluent fraction has its temperature adjusted to range from about 80° F. to about 95° F. just previous to blending, and after blending cooling the blend to a temperature ranging from about 80° F. to about 95° F.

4. The method of claim 1 wherein the concentrate fraction is formed by adding the triglyceride and emulsifiers in solid condition to the first portion of the oil vehicle, and then melting all the constituents of said formed concentrate fraction.

5. The method of claim 1 wherein the temperature of the diluent fraction is higher than about 100° F. just previous to step (c).

6. The method of claim 3 wherein the diluent fraction from step (c) is seeded with from about 0.05% of its weight to about 10% of its weight of liquid shortening containing beta-phase triglyceride crystals.

7. The method of claim 6 wherein the diluent fraction from step (c) is seeded with from about 0.5% to about 2% of its weight of finished shortening product of step (e).

8. The method of claim 6 wherein the blending in step (d) is carried out by introducing all of said diluent fraction into a blending zone previous to the time any concentrate fraction is introduced into that zone, then adding to and admixing with the batch of diluent fraction concentrate fraction, said addition being carried out at a rate ranging from about 0.008% to about 0.25% of the initial weight of the concentrate fraction to be blended per second.

9. The method of claim 8 where the rate of concentrate fraction addition ranges from about 0.01% to about 0.025% of the initial weight of the concentrate fraction to be blended per second.

10. The method of claim 6 where blending is carried out by introducing concentrate fraction and diluent fraction into a blending zone continuously and simultaneously.

References Cited

UNITED STATES PATENTS

| | | | |
|---|---|---|---|
| 2,521,242 | 9/1950 | Mitchell | 99—118 |
| 3,350,207 | 10/1967 | Koren | 99—90 |
| 3,369,909 | 2/1968 | Schroeder et al. | 99—118 |

JOSEPH M. GOLIAN, Primary Examiner

U.S. Cl. X.R.

99—90